Figure 1:
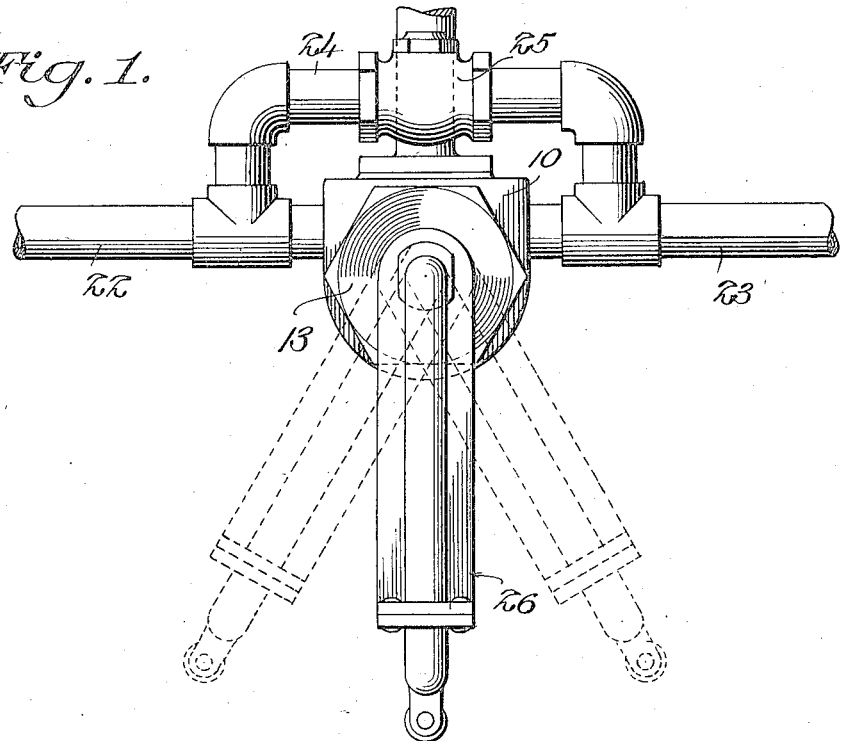

Dec. 11, 1923. 1,477,514
R. L. MILLER
VALVE MECHANISM FOR AUTOMATIC TRAIN CONTROL APPARATUS
Filed March 6, 1922

Inventor
Robert L. Miller,
by Bright & Bailey
Attorneys

Patented Dec. 11, 1923.

1,477,514

UNITED STATES PATENT OFFICE.

ROBERT L. MILLER, OF SPOKANE, WASHINGTON, ASSIGNOR TO OTIS AUTOMATIC TRAIN CONTROL, INC., OF SPOKANE, WASHINGTON, A CORPORATION OF WASHINGTON.

VALVE MECHANISM FOR AUTOMATIC TRAIN-CONTROL APPARATUS.

Application filed March 6, 1922. Serial No. 541,551.

To all whom it may concern:

Be it known that I, ROBERT L. MILLER, a citizen of the United States, and resident of Spokane, in the county of Spokane and State of Washington, have invented certain new and useful Improvements in Valve Mechanisms for Automatic Train-Control Apparatus, of which the following is a specification.

My invention relates to valve mechanisms for automatic train control apparatus, and has particular reference to improvements in valve mechanisms of the general type disclosed in the copending application of Kent and Miller filed July 27, 1921, Serial Number 487,946, and in my copending application filed March 6, 1922, and serially numbered 541,552.

The broad purpose of my present invention is the same as the broad purpose of the mechanisms disclosed in the prior applications referred to, namely, to provide a valve mechanism which will permit an engineer to set or release his brakes during such times as he is alert and properly observant of signals, but which will act, upon contact with ramp devices which are preferably operated in conjunction with the usual signals, to cause an automatic application of his brakes in the event he fails to observe or heed said signals.

Specifically, it is the purpose of my present invention to provide a mechanism of the type mentioned which is of extremely simple construction, cheap to produce, compactly arranged, sturdy and unlikely to become broken or disordered, and which is thoroughly reliable, positive and efficient in operation.

My inventive idea is capable of embodiment in different mechanical constructions and arrangements, one of which is illustrated in the accompanying drawings, but it is to be understood that the structure shown is merely intended as a disclosure of the essential features and novel characteristics of my invention in a preferred form, and that various changes, modifications and desirable additions may be made in and to the same within its scope as defined in the appended claims.

In the drawings which are illustrative of features of novelty to be more fully described in detail hereinafter, and wherein like characters of reference denote corresponding parts in the different views.

Figure 2:
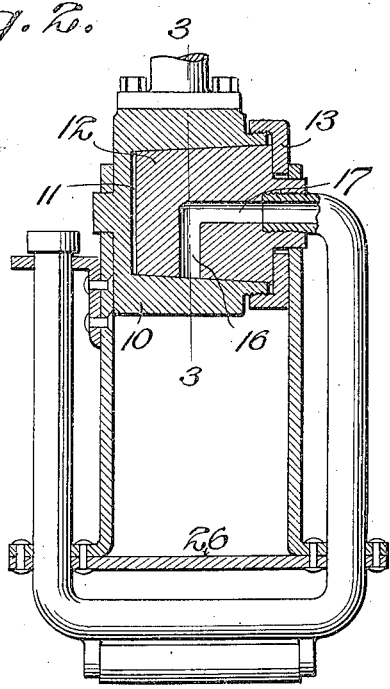

Figure 1 is a side elevation of my improved valve mechanism showing the manner of connecting the same with the train line and supply pipes of an usual type of air brake system;

Figure 2, a transverse central section through my improved valve mechanism; and

Figure 3:
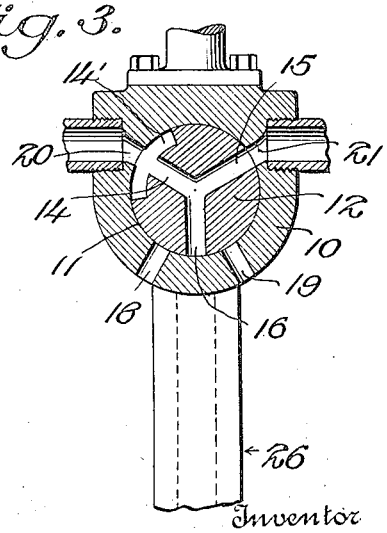

Figure 3, a section on the line 3—3 of Figure 2.

Referring now to the drawings in detail, 10 designates a valve casing which is adapted to be suitably and permanently secured to a locomotive or other like vehicle, whereby certain movable elements of the mechanism are disposed for actuation by suitable ramp devices (not shown) located along the tracks. This valve casing is provided with a longitudinal bore 11 in which is rotatably mounted a plug valve 12 held in assembled relation with the casing by a nut 13, said bore and plug preferably being tapered as shown whereby wear may be quickly and easily taken up by tightening the nut 13 as is apparent.

Formed in the plug 12 are three radial passages 14, 15 and 16 which relatively intersect at the center of the plug and which are substantially equidistantly spaced circumferentially thereof as shown. These passages open through the outer surface of the plug and one of them, 14, terminates in a channel 14' of limited length which extends circumferentially in both directions therefrom. Also formed in the plug is an axial passage 17 which opens through one end of the plug and is in communication with the radial passages aforementioned.

The casing 10 has formed therein near its lower end a pair of circumferentially spaced passages or ports 18 and 19 which open into the bore 11 and to the atmosphere, while above these passages or ports, in opposite sides of the casing are formed ports 20 and 21 which open into the bore 11 and have communicating therewith, respectively, the train line pipe 22 and the fluid pressure pipe 23 of a usual type of air brake system, the latter pipe leading to the engineer's valve (not shown) whereby the pressure of fluid in the train line may be controlled for setting and releasing the brakes in the usual well known manner.

In the normal relation of the parts described in the foregoing and as shown in Figure 3 of the drawings, passage 14 is disposed in communication with the train line 22 through passage 20 in the casing; passage 15 is disposed in communication with the fluid pressure pipe 23 through passage 21 in the casing, and passage 16 is disposed between the passages or ports 18 and 19 and is closed by that portion of the casing between said ports. Thus the fluid pressure pipe is normally in open communication through the valve with the train line and the engineer is able to control the pressure of fluid in the train line to set and release his brakes in the ordinary well known manner. However, if the plug is rotated a predetermined amount in either direction, passage 16 will become alined with one or the other of ports 18 or 19, and passage 15 will become disalined with passage 21, but passage 14 will remain in communication with passage 20 due to the circumferential channel 14'. Thus, communication between the fluid pressure pipe and the train line will be cut off and fluid will be exhausted from the train line through passage 16 and one or the other of ports 18 or 19, depending upon whether the plug is rotated to the right or left, which will cause the brakes to become set and take control of them out of the hands of the engineer, except that he may give an emergency application by exhausting air from the train line by way of the by-pass pipe 24 and check valve 25 therein which opens in the direction of the engineer's valve.

The means for rotating the plug 12 consists of a shoe 26 connected to the plug and depending therefrom so as to be engageable with a ramp device and which is adapted to be moved angularly to rotate the plug in one direction or the other, depending upon whether the locomotive or other vehicle carrying the mechanism is proceeding ahead or backing up. This shoe is of duplicate construction to the shoe disclosed in my copending application previously referred to and includes a pipe bent into U-shape and connected with the axial passage 17 whereby breakage or rupture thereof will result in loss of air from the train line with a consequent reduction of pressure and setting of the brakes.

I claim:—

1. In mechanism of the class described, a valve including a hollow casing having a pair of ports opening into the interior thereof and adapted to be connected respectively with a fluid pressure pipe and a fluid pressure supply pipe, said casing further having another pair of ports opening into the interior thereof and communciating with the atmosphere, and a rotatable plug in said casing provided with plural relatively communicating passages so arranged that one of the same is out of communication with both of said atmospherically opening ports when others are in communication respectively with said fluid pressure pipe and said fluid pressure supply pipe, and means whereby communication is established between said fluid pressure pipe and one of said atmospherically opening ports upon a predetermined amount of rotation of said plug in either direction.

2. In mechanism of the class described, a valve including a hollow casing having a pair of ports opening into the interior thereof and adapted to be connected respectively with a fluid pressure pipe and a fluid pressure supply pipe, said casing further having another pair of ports opening into the interior thereof and communicating with the atmosphere, and a rotatable plug in said casing provided with plural relatively communicating passages so arranged that one of the same is out of communication with both of said atmospherically opening ports when others are in communication respectively with said fluid pressure pipe and said fluid pressure supply pipe, and means whereby communication is established between said fluid pressure pipe and one of said atmospherically opening ports and communication is cut off between said fluid pressure supply pipe and all of said passages and ports upon a predetermined amount of rotation of said plug in either direction.

3. In mechanism of the class described, a valve including a hollow casing having a pair of ports opening into the interior thereof and adapted to be connected respectively with a fluid pressure pipe and a fluid pressure supply pipe, said casing further having another air of ports opening into the interior thereof and communicating with the atmosphere, and a rotatable plug in said casing provided with plural relatively communicating passages so arranged that one of the same is out of communication with both of said atmospherically opening ports when others are in communication respectively with said fluid pressure pipe and said fluid pressure supply pipe, and a circumferential channel providing communication between said fluid pressure pipe and one of the passages in said plug in all predetermined rotated positions of the latter.

4. In mechanism of the class described, a valve including a hollow casing having a pair of ports opening into the interior thereof and adapted to be connected respectively with a fluid pressure pipe and a fluid pressure supply pipe, said casing further having another pair of ports opening into the interior thereof and communicating with the atmosphere, and a rotatable plug in said casing provided with plural relatively communicating passages so arranged that one of the same is out of communication with both of said atmospherically opening ports when others are in communication respectively with said fluid pressure pipe and said fluid pressure supply pipe, an axial passage in said plug communicating with the aforementioned passages therein, and a member secured to said plug for rotating the same, said member being hollow and in constant communication with said axial passage.

In testimony whereof I hereunto affix my signature.

ROBERT L. MILLER.